United States Patent
Lin et al.

(10) Patent No.: US 7,609,271 B2
(45) Date of Patent: Oct. 27, 2009

(54) PRODUCING ANIMATED SCENES FROM STILL IMAGES

(75) Inventors: Zhouchen Lin, Beijing (CN); Lifeng Wang, Beijing (CN); Yunbo Wang, Shanghai (CN); Jian Wang, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 180 days.

(21) Appl. No.: 11/428,195

(22) Filed: Jun. 30, 2006

(65) Prior Publication Data

US 2008/0001950 A1    Jan. 3, 2008

(51) Int. Cl.
*G06T 13/00* (2006.01)

(52) U.S. Cl. .................................................. 345/474

(58) Field of Classification Search ............... None
See application file for complete search history.

(56) References Cited

U.S. PATENT DOCUMENTS

| | | | | |
|---|---|---|---|---|
| 5,953,506 A * | 9/1999 | Kalra et al. ............... | 709/231 |
| 5,995,668 A * | 11/1999 | Corset et al. ............. | 382/233 |
| 6,064,393 A | 5/2000 | Lengyel et al. | |
| 6,137,837 A * | 10/2000 | Nemiroff et al. ........ | 375/240.16 |
| 6,233,356 B1 | 5/2001 | Haskell et al. ........... | 382/243 |
| 6,252,604 B1 | 6/2001 | Snyder et al. | |
| 6,266,053 B1 | 7/2001 | French et al. | |
| 6,487,565 B1 | 11/2002 | Schechter et al. | |
| 6,504,546 B1 * | 1/2003 | Cosatto et al. ........... | 345/473 |
| 6,512,522 B1 * | 1/2003 | Miller et al. ............. | 345/474 |
| 6,553,150 B1 * | 4/2003 | Wee et al. ................ | 382/243 |
| 6,600,491 B1 * | 7/2003 | Szeliski et al. .......... | 345/473 |
| 6,636,220 B1 * | 10/2003 | Szeliski et al. .......... | 345/475 |
| 6,810,131 B2 * | 10/2004 | Nakagawa et al. ...... | 382/100 |
| 6,873,327 B1 | 3/2005 | Edwards et al. | |
| 6,888,548 B1 * | 5/2005 | Gallivan ................... | 345/440 |
| 6,914,612 B2 * | 7/2005 | Hino et al. ............... | 345/582 |
| 6,919,891 B2 | 7/2005 | Schneider et al. | |
| 6,987,516 B2 | 1/2006 | Dery | |
| 6,987,875 B1 * | 1/2006 | Wallack ................... | 382/146 |
| 7,027,086 B1 | 4/2006 | Ozawa et al. | |
| 7,196,705 B2 * | 3/2007 | Gallivan ................... | 345/440 |
| 7,236,165 B2 * | 6/2007 | Dautelle .................. | 345/418 |
| 7,251,364 B2 * | 7/2007 | Tomita et al. ............ | 382/180 |
| 7,264,356 B2 * | 9/2007 | Jones et al. .............. | 351/242 |
| 7,310,589 B2 * | 12/2007 | Li ............................ | 702/179 |

(Continued)

OTHER PUBLICATIONS

Makris et al. Finding Paths in Video Sequences. British Machine Vision Conference. 2001.*

(Continued)

*Primary Examiner*—Peter-Anthony Pappas
(74) *Attorney, Agent, or Firm*—Lee & Hayes, PLLC

(57) ABSTRACT

A strategy is described for producing an animated scene from multiple high resolution still images. The strategy involves: creating a graph based on an analysis of similarity among the plural still images; performing partial temporal order recovery to define a partial ordering among the plural still images; and extracting an output sequence from the plural still images using second-order Markov Chain analysis, using the partial ordering as a reference. The strategy can perform the above-described analysis with respect to multiple independent animated regions (IARs) within the still images. Further, the strategy can decompose any IAR with a significant amount of motion into multiple semi-independent animated regions (SIARs). The SIARs are defined to be weakly interdependent.

17 Claims, 8 Drawing Sheets

U.S. PATENT DOCUMENTS

| | | | |
|---|---|---|---|
| 2002/0032697 A1* | 3/2002 | French et al. | 707/500.1 |
| 2002/0154133 A1 | 10/2002 | Dery | |
| 2002/0158972 A1 | 10/2002 | Stephany et al. | |
| 2004/0125124 A1* | 7/2004 | Kim et al. | 345/716 |
| 2004/0228530 A1* | 11/2004 | Schwartz et al. | 382/173 |
| 2005/0028101 A1* | 2/2005 | Vienneau et al. | 715/716 |
| 2005/0193408 A1* | 9/2005 | Sull et al. | 725/32 |
| 2005/0226335 A1* | 10/2005 | Lee et al. | 375/240.16 |
| 2005/0231513 A1 | 10/2005 | LeBarton et al. | |
| 2005/0233788 A1* | 10/2005 | Tzschoppe | 463/1 |
| 2007/0086621 A1* | 4/2007 | Aggarwal et al. | 382/103 |

OTHER PUBLICATIONS

Aoki, et al., "Dynamic Texture: Physically-based 2D Animation," ACM SIGGRAPH 99, 1999, available at <<http://www.cg.is.sci.toho-u.ac.jp/publications/dtex.pdf>>, accessed on Aug. 10, 2006, 3 pages.

Barron, et al., "Performance of Optical Flow Techniques," IJCV, vol. 12, No. 1, 1994, pp. 43-77.

Bergen, et al., "Hierarchical Model-Based Motion Estimation," ECCV'92, 1992, pp. 237-252.

Bhat, at al., "Flow-based Video Synthesis and Editing," ACM Transactions on Graphics, 2004, vol. 23, No. 4, pp. 360-363.

Bregler, et al., "Video Rewrite: Driving Visual Speech with Audio," Computer Graphics Proceedings, Annual Conference Series, 1997, pp. 353-360.

Canopus "Imaginate," Still Image Animation Software for Windows, available at <<http://www.adoramacom/VDCAIMAG.html>>, accessed on Apr. 17, 2006, 2 pages.

Chuang, et al., "Animating Pictures with Stochastic Motion Textures," ACM Transactions on Graphics, vol. 24, Issue 3, Proceedings of ACM SIGGRAPH, 2005, pp. 853-860.

Dalal, et al., "Negotiation for Automated Generation of Temporal Multimedia Presentations," Proceedings of the Fourth ACM International Conference on Multimedia, 1997, pp. 55-64.

"Floyd's algorithm," available at <<http://www.cs.auckland.ac.nz/~ute/220ft/praphalg/node21.html>>, accessed on May 28, 2006, 2 pages.

Freeman, et al., "Motion without Movement," Computer Graphics, Jul. 1991, vol. 25, No. 4, pp. 27-30.

Wang, at al., "Modeling Textured Motion: Particle, Wave and Sketch," Proceedings of the International Conference on Computer Vision, 2003, pp. 213-220.

"Let talking animated characters appear as you inside Skype Video!," CrazyTalk for Skype: Interactive faces for Skype animation, available at <<http://www.reallusion.com/crazytalk4skype/>>, accessed on Apr. 17, 2006, 2 pages.

Litwinowicz, et al., "Animating Images with Drawings," Proceedings of the 21st annual conference on computer graphics and interactive techniques, 1994, pp. 409-412.

"Marcov chain," Wikipedia, the free encyclopedia, available at <<http://en.wikipedia.org/wiki/Marcov_chain>>, accessed on May 28, 2006, 6 pages.

"Optical Flow," available at <<http://homepages.inf.ed.ac.uk/rbf/CVonline/LOCAL-COPIES/OWENSLECT12/node4.ht...>>, accessed on May 30, 2006, 3 pages.

"Optical Flow," From Wikipedia, the free encyclopedia, available at <<http://en.wikipedia.org/wiki/Optical_flow>>, accessed on May 30, 2006, 1 page.

Schodl, et al., "Controlled Animation of Video Sprites," ACM SIGGRAPH Symposium on Computer Animation, 2002, pp. 121-127, and 196.

Schodl, et al., "Video Textures," Proceedings of SIGGRAPH 2000, 2000, pp. 489-498.

Sedgewick, "Algorithms: Third Edition in C++ Part 5: Graph Algorithms," Addison Wesley, 2002, 496 pages.

Soatto, et al., "Dynamic Textures," Proceedings of the International Conference on Computer Vision, 2001, pp. 439-446.

"StillMotion Creator Operation and Benefits," available at <<http://www.imagematics.com/Product/benefits.htm>>, accessed on Apr. 17, 2006, 2 pages.

Sun, at al., "Video Input Driven Animation (VIDA)," International Conference on Computer Vision, 2003, vol. 9, pp. 96-103.

Szummer, et al., "Temporal Texture Modeling," Proceedings of the 1996 IEEE International Conference in Image Processing, Part 3, 1996, vol. 3, pp. 823-826.

"Thinning," available at <<http://www.cee.hw.ac.uk/hipr/html/thin.html>>, accessed on May 28, 2006, 6 pages.

Treuille, et al., "Keyframe Control of Smoke Simulations," ACM Transactions on Graphics, 2003, vol. 22, No. 3, pp. 716-723.

* cited by examiner

PRODUCING ANIMATED SCENES FROM STILL IMAGES

BACKGROUND

A single still image can convey a significant amount of detail regarding a scene. For instance, some consumer digital cameras can currently generate an image with a resolution of 16 MPixels. However, a single still image does not adequately communicate motion within a scene. Video, of course, does capture the dynamic nature of a scene. But video is often of much lower resolution than still images produced by a still-capture camera. For example, a typical commercial video camera may capture a scene with a resolution of 720×480 pixels at 30 frames per second (fps).

Alternative solutions have been proposed for capturing a scene. In one such exemplary solution, frames from conventional video can be selected and synthesized to produce a so-called video texture. For example, this solution can play a collection of video frames as a loop by selecting an appropriate juncture in an image sequence to gracefully transition from the end of the sequence to the beginning of the sequence. In another exemplary solution, a user can manually supplement a single still image by manually segmenting objects in the image and inputting motion parameters. A mechanism can then use these motions parameters to introduce motion into the still image.

The above-described solutions have various shortcomings. For instance, the first solution creates an animated scene based on conventional video. As such, the animated scene may have relatively low resolution. The second solution may require the user to spend a considerable amount of time to segment objects and input the motion parameters. A user may find this high level of interaction burdensome and susceptible to possible error.

For at least the above-identified exemplary and non-limiting reasons, there is a need in the art for more satisfactory strategies for producing animates scenes.

SUMMARY

A strategy is described for producing an animated scene from multiple high resolution still images. The strategy involves: creating a graph based on an analysis of similarity among the plural still images; performing partial temporal order recovery to define a partial ordering among the plural still images; and extracting an output sequence from the plural still images using second-order Markov Chain analysis, using the partial ordering as a reference.

The strategy can perform the above-described analysis with respect to multiple independent animated regions (IARs) within the still images. As the name suggests, each of the IARs exhibits motion which can be analyzed in independent fashion from the other IARs. Further, the strategy can decompose an IAR with a significant amount of motion into multiple semi-independent animated regions (SIARs). The SIARs are defined to be weakly interdependent.

The strategy can be implemented using a computer or other kind of processing equipment. The computer can produce one or more user interface presentations that allow the user to: identify a collection of still images for processing; specify IARs within the still images; define motion-related properties associated with respective IARs, and so on.

This Summary section refers to exemplary manifestations of the subject matter described herein, and hence does not limit the scope of the invention set in the Claims section.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The subject matter set forth herein pertains to a strategy for synthesizing an animated scene from a collection of digital still images (alternatively referred to herein as simply "images" or "input images" for brevity). The strategy produces dramatic results when applied to images that have high resolution produced by a digital camera or other image capturing technology. The term "high resolution" means a resolution that is typically higher than conventional forms of commercial video. However, the strategy can also be applied to images that have lower resolution, including images having video-grade resolution.

The images can represent any kind of subject matter, expressed in any kind of format. However, the strategy provides best results when applied to scenes that have some semblance of regular motion. For example, a user can take a series of still images of a tree as it sways back and forth in a gentle breeze. The user can then use the strategy to synthesize the motion of the tree based on these photographs. In this example, the motion of the tree loosely exhibits periodic motion. Other subjects that can be modeled include a flickering flame, an undulating wave, a man's gait as he walks on a treadmill, a bouncing ball, a woman shaking her head back and forth, and so on. Many other applications are possible.

This disclosure includes the following sections. Section A describes an exemplary system for transforming a series of still images into an animated scene. Section B describes one exemplary procedure that explains the operation of the system of Section A. And Section C describes various user interface presentations produced by the system of Section A that enable the user to interact with the system.

Figure 1:
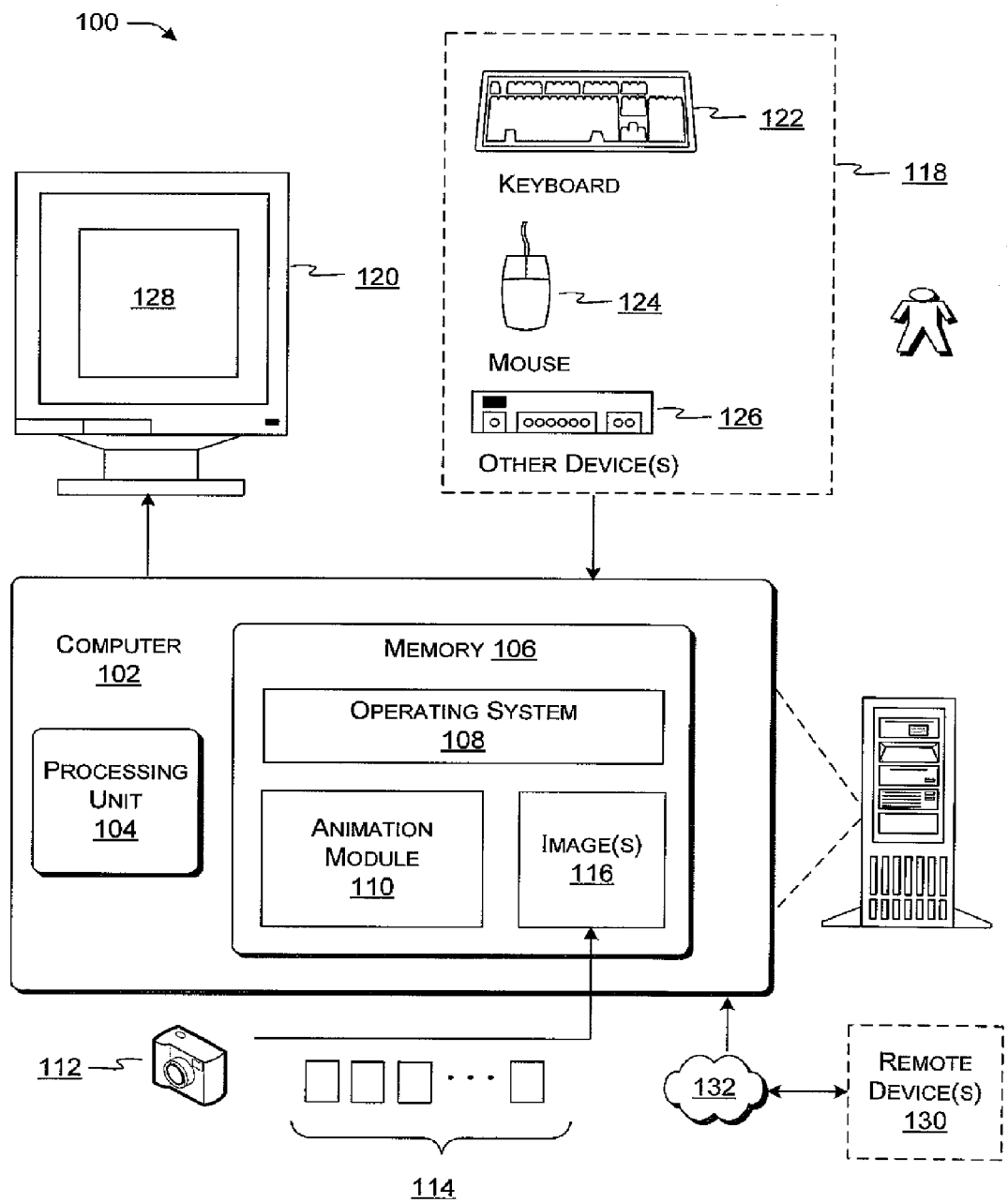
FIG. 1 shows an exemplary system that can be used to transform plural high resolution still images into an animated scene.
Figure 2:
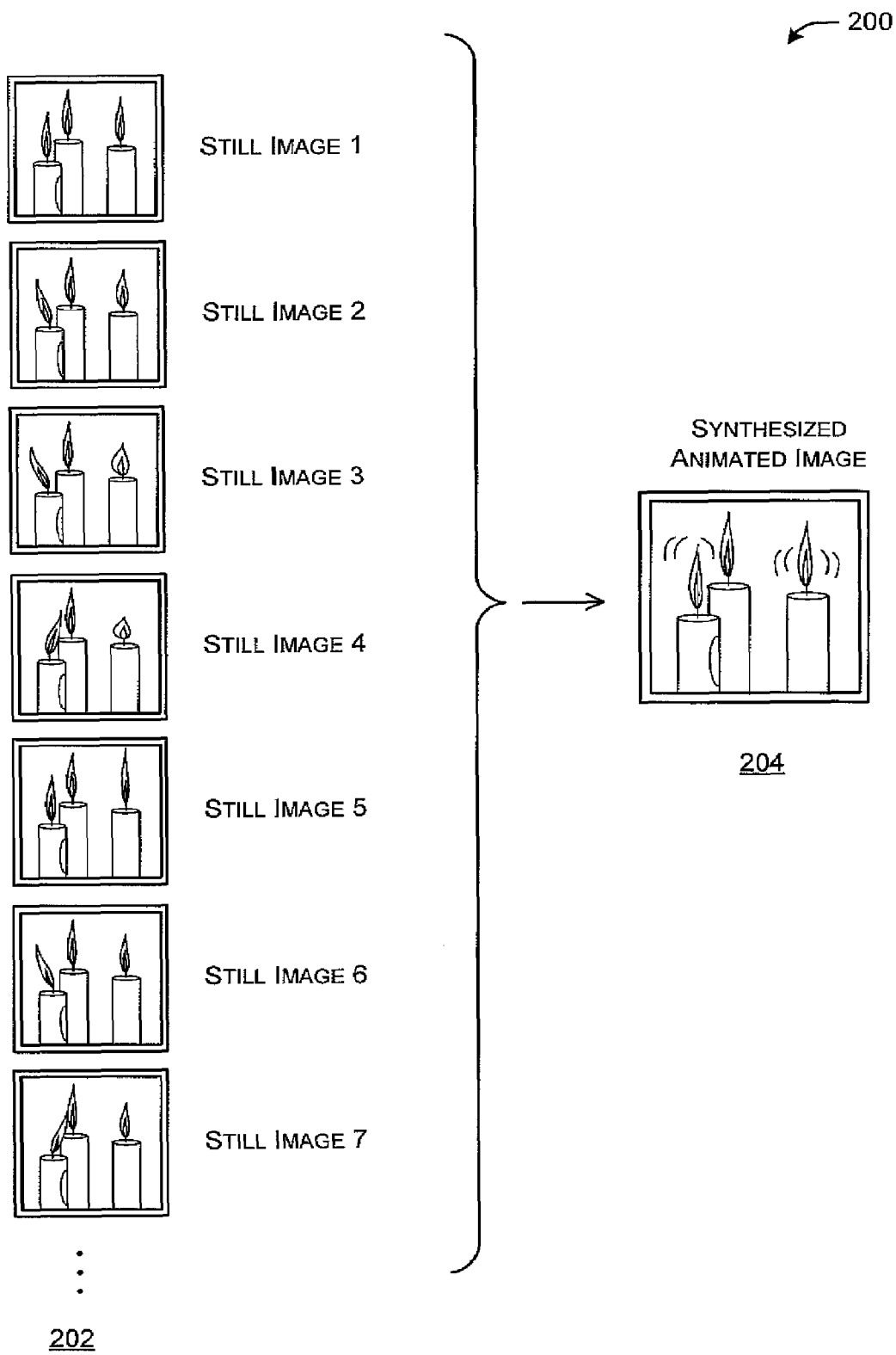
FIG. 2 shows an exemplary transformation produced using the system of FIG. 1.

A. Exemplary System (FIGS. 1 and 2)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. Overview of System

FIG. 1 shows an example of one system 100 that can be used to implement the animation strategy described herein. In this system 100, the strategy can be implemented by a computer 102, such as a personal computer. The computer 102 includes conventional hardware components, such as a processing unit 104 (or plural processing units) and various volatile and/or non-volatile memory 106. The memory 106 can store instructions which can be executed by the processing unit 104 to perform various functions. Although not shown, the computer 102 can also include various media functionality (such as hard disk, etc.), input/output interfaces, network interfaces, graphical processing units, and so on (not shown). In another implementation, the animation strategy can be implemented by some other kind of processing device (e.g., other than a personal computer), such as game console, a mobile telephone, a set-top box, a personal digital assistant (PDA) device, and so forth. In yet another implementation, the animation module 110 can be implemented by any kind of specialized hardware, or by a combination of a programmable processing device and specialized hardware.

In the computer implementation of FIG. 1, the memory 106 can include an operating system 108 that performs base-level operating tasks. The memory 106 can also include one or more applications which run "on top" of the operating system 108 and utilize its resources. One such application is an animation module 110. The animation module 110 implements the animation strategy described herein. In this implementation, the animation module 110 is constructed from machine-readable instructions which perform prescribed operations when these instructions are executed by the processing unit 104.

Any kind of image capture technology, such as a digital camera 112, can be used to capture a series of still images 114 at different respective times. The digital camera 112 may store the images on a portable memory module (not shown), such as a memory card. The system 100 can transfer the images 114 to the computer 102 in various conventional ways, such as via a universal serial bus (USB) interface. The computer 102 can store the images 114 in one or more stores. For instance, FIG. 1 shows that a portion of the memory 106, e.g., image store 116, can be allocated for storing: the input images 114; any kind of animated output of the animation module 110; and any intermediate image content produced by the animation module 110.

A user can interact with the computer 102 via one or more input devices 118 and a display device 120. The input devices 118 can comprise a keyboard 122, a mouse device 124, or any other kind of input device 126. The display device 120 can comprise any kind of computer display monitor. The display device 120 provides a user interface presentation 128. The user interface presentation 128 can display input images, animated output images, command buttons, menus, and so forth. Through these user interface mechanisms, the user can identify images for processing, select regions within the input images, define motion-related properties that govern the behavior of the regions, and so on. Section C (below) describes exemplary aspects of various user interface presentations produced by the system 100

The above-described implementation represents a standalone computer implementation of the animation strategy. In another case, the computer 102 can represent a server computer that is accessible by one or more remote devices 130 via a s network coupling 132. The network coupling 132 can comprise a WAN-type coupling (e.g., the Internet), a LAN-type coupling, or some combination thereof. In this implementation, the user can upload the images 114 to the server computer 102 from the remote device 130. The server computer 102 can then process the images 114 and provide an animated scene to the user at the remote device 130.

A.2. Exemplary Input and Output of the System

FIG. 2 shows an overview of an exemplary series of input images 202 and an exemplary animated scene 204 produced from the input images 202. An introductory explanation of salient features of the input images 202 and the animated scene 204 will assist the reader in understanding the algorithmic aspects of the animation module 110, presented below in Section B.

The exemplary series of input images 202 captures a physical scene containing three lit candles. In this case, the user has taken a set of seven pictures of this scene using a digital camera of high resolution. The case of seven input images is merely illustrative; the animation strategy can be applied to smaller sets of input images or larger sets of input images.

The general expectation is that the user will capture the seven images 102 in relatively rapid succession. For example, an interval of one or more seconds can separate each successive image capture. However, the strategy described herein can be applied to smaller capture intervals or longer capture intervals. In any event, the intervals separating the different input images 202 need not be equal in duration (and, in fact, are generally not equal in duration).

In this entirely illustrative scenario, the left-most candle has a flame that quasi-periodically sways from left to night in the breeze, and then back again. The right-most candle has a flame that quasi-periodically increases and decreases in length, as it simultaneously decreases and increases in width. The middle flame, by contrast, does not exhibit any significant motion. Other aspects of the scene, such as the candlestick portions of the candles and the background, likewise do not exhibit any significant motion. As will be described, the animation module 110 can allow the user to define two different independent animation regions (IARs) to capture the independent movement of the left-most flame and the right-most flame, respectively. The animation module 110 can apply separate analysis to these two different regions to help improve the realism of the animated scene that is output.

The animated output image 204 moves in a manner that should preferably mimic the movement of the flames in the physical scene. In one implementation, the animation is module 110 is can present an animated sequence of finite duration. In another implementation, the animation module 110 can present an animated scene of unlimited duration, e.g., by playing the synthesized input images 202 in a loop. In either the finite playback mode or the infinite playback mode, in one case, the animation module 110 can deterministically produce the animated scene 204 such that it exhibits exactly the same behavior upon each playback. Or the animation module 110 can introduce a random element into the synthesis, such that each playback of the sequence is different.

A few features of the animation process as a whole warrant noting at this time. First, the animation module 110 uses a number of input images 202 that may significantly undersample the actual physical movement of the scene. Second, due in part to this temporal under-sampling, the original capture order may not represent the true dynamics of the physical scene. In other words, unlike video, the original capture order may represent disjointed states of the physical scene that, in unmodified form, do not form a meaningful temporal one-dimensional sequence. Thus, the animation module 110 cannot as a general rule produce the animated scene 204 by simply interpolating the images 202 in the initial order in which they were captured. Doing so will likely produce a scene having unnatural dynamics. Further, depending on the scene, it may be difficult or impossible for a user to manually reconstruct a satisfactory ordering of input images. This is particularly true when the scene has regions which exhibit independent motion. To overcome these difficulties, the animation module 110 achieves intelligent reordering of images using a multistage process. This multistage process is the topic of the next section.

Figure 4:
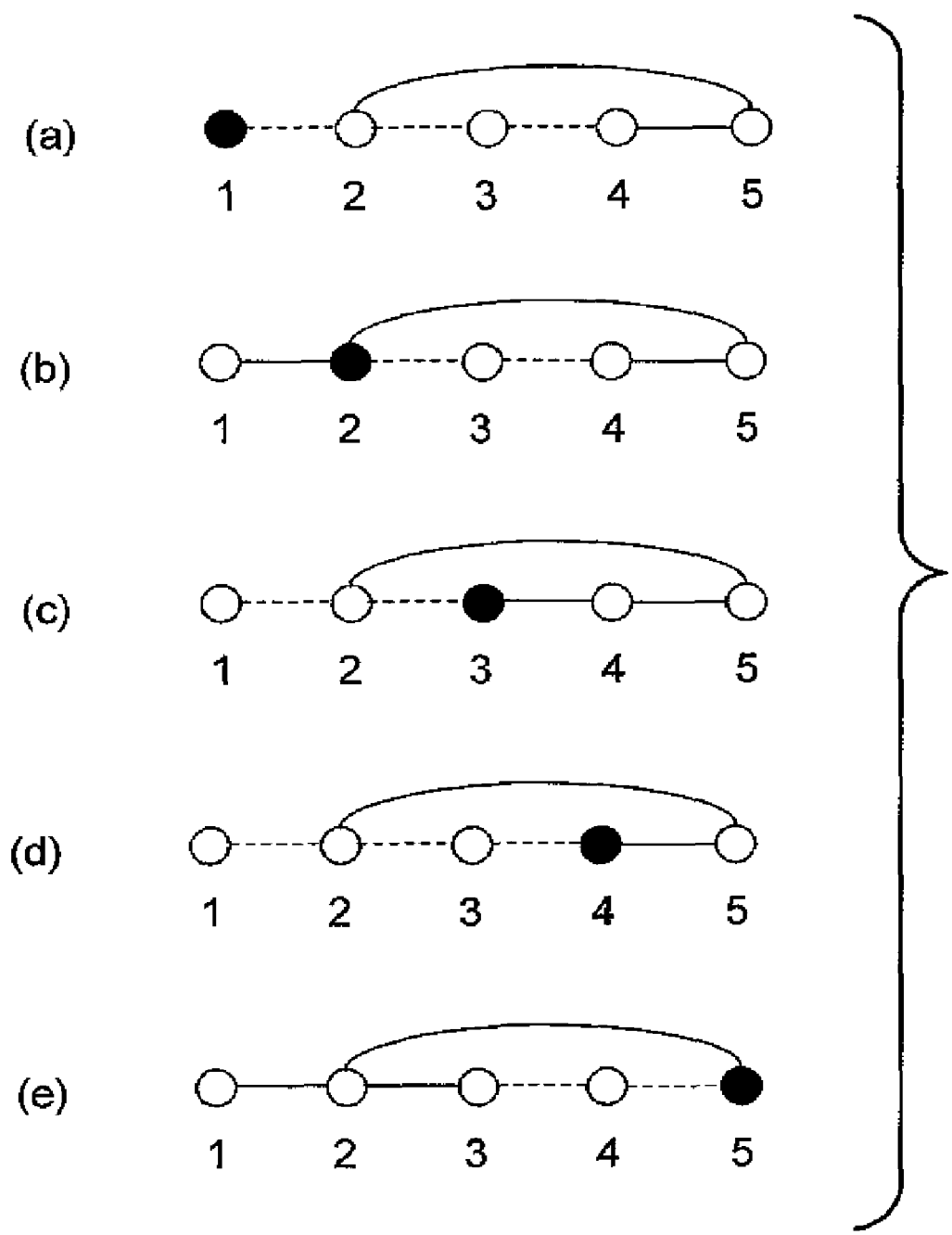
FIG. 4 illustrates an operation for partially recovering temporal ordering, as performed in the procedure of FIG. 3.
Figure 5:
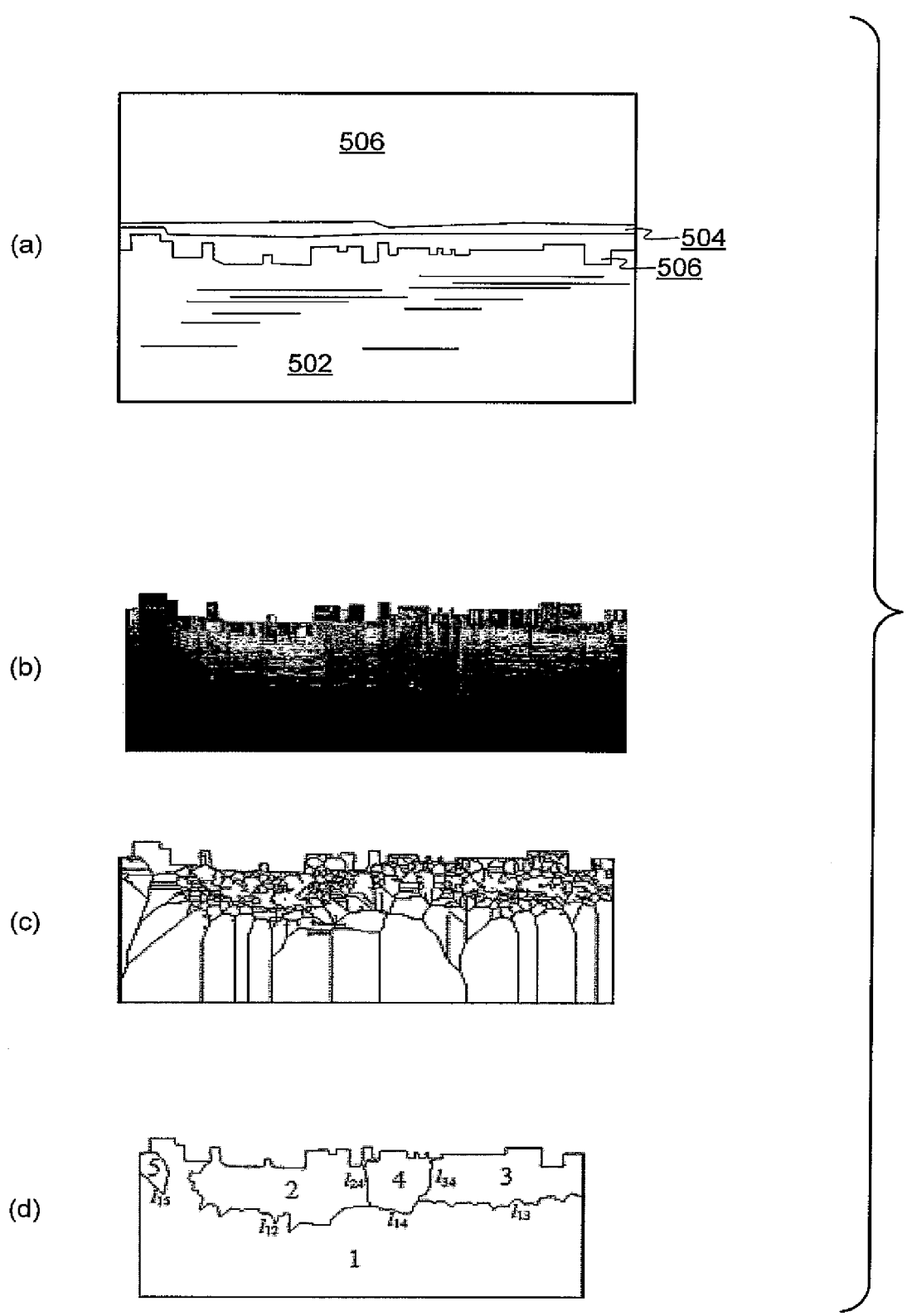
FIG. 5 illustrates an operation for decomposing part of an image into plural semi-independent animated regions (SIARs), as performed in the procedure of FIG. 3.

B. Exemplary Processes (FIGS. 3-5)

B.1. Overview of the Procedure

Figure 3:
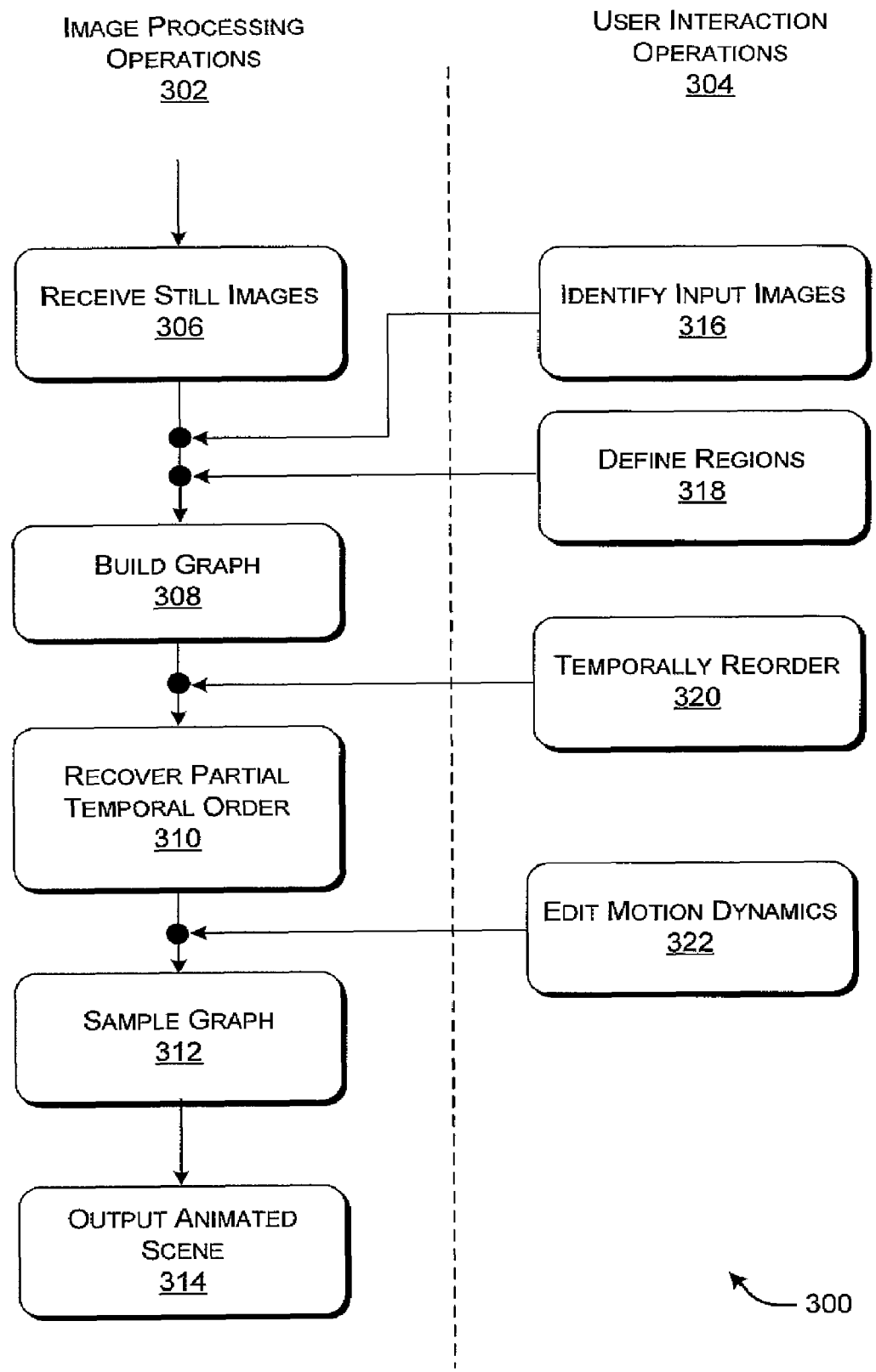
FIG. 3 shows a procedure that sets forth one exemplary manner of operation of the system of FIG. 1.

FIG. 3 shows an overview of one exemplary procedure 300 that can be used by the application module 110 to process still images to produce an animated output image. To facilitate discussion, certain operations are described as constituting distinct steps performed in a certain order. Such implementations are exemplary and non-limiting. Certain operation can be grouped together and performed in a single operation, and certain operations can be performed in an order that differs from the order employed in the examples set forth in this disclosure.

Certain aspects 302 of the procedure 300 are performed by the animation module 110 in automated fashion. These operations involve substantially no interaction with the user. Other aspects 304 of the procedure 300 are performed by the animation module 110 in manual fashion or semi-automatic fashion. These operations involve interaction with the user via one or more user interface presentations (described in Section C below). The automated aspects 302 of the procedure 300 are described first, followed by the manual aspects 304. Later subsections provide additional details regarding individual blocks within the procedure 300.

As to the automatic operations 302, in block 306, the animation module 110 receives a series of input images. The computer 102 can physically receive the input images in the manner described above, e.g., via a USB interface, etc. The animation module 110 can store the identified input images in an appropriate part of memory 106 for processing, such as in the image store 116.

In block 308, the animation module 110 builds a graph that expresses similarities among the input set of images. More specifically, the animation module 110 produces a graph in which each node represents a different input image (or part thereof). A link between any pair of nodes in the graph defines an assessed degree of similarity between the images associated with the pair of nodes. Similar nodes intuitively represent images that the user is likely to perceive as being similar.

In block 310, the automation module 110 applies an automatic partial temporal order recovery algorithm to the images to approximate the original scene dynamics. That is, the temporal order recovery algorithm automatically suggests orders for subsets of images in the graph. These partial orders provide reference dynamics for later stages of the animation process.

In block 312, the automation module 110 extracts an output sequence of images using a second-order Markov Chain model.

In block 314, the automated module 110 outputs a final animated scene image that reflects the analysis performed in the proceeding operations.

Now addressing certain manual aspects 304 of the processing performed by the animation module 110, in block 316, the user identifies a group of input images to be processed by the animation module 110. Section C describes one exemplary user's interface presentation through which the user can select these input images and then subsequently interact with the images.

In block 318, the animation module 110 allows the user to manually specify regions that exhibit independent motion, referred to as independent animated regions (IARs). In the example of FIG. 2, the left-most flame exhibits a behavior that is independent of the right-most flame. Therefore, the user may wish to define these two flames as respective IARs. Section C describes one user interface presentation through which the user can graphically define IARs. Once defined, the automated analysis 302 described above (in blocks 308-312) can be performed separately for each IAR. Breaking up the motion in a scene into plural IARs generally improves the quality of the final animated scene.

In addition to specifying IARs, the user can instruct the automated module 110 to further decompose one or more IARs into smaller regions, called semi-independent animated regions (SIARs). An IAR with large motion variation is a particularly good candidate to be broken down into plural SIARs. This operation further improves the realism of the animated scene. The SIARs are said to be "semi-independent" because they are generally independent, yet exhibit some interdependence. In this sense, the SIARs can also be said to be weakly or softly interdependent. The interdependence ensures that motion will appear smooth in the transitions from one SIAR to another. To define this interdependence, the automated module 110 can determine a preferred processing order in which to create the SIARs.

In block 320, the animation module 110 permits the user to manually modify the graph produced in operation 308. For instance, the user can redefine paths among images, establish new paths, delete old paths, and so on.

In block 322, the animation module 110 can allow the user to input various parameters that will subsequently govern the dynamic behavior of the animated scene. One such exemplary parameter that can be provided governs the speed of movement in the animated scene. As described in Section C, the animation module 110 can allow the user to define motion parameters on a per-IAR basis, such that different IARs can be made to exhibit different kinds of behavior. FIG. 3 illustrates that block 322 is positioned at a specific juncture within the procedure 300. But more generally, the operations associated with block 322 can be performed at other junctures in the procedure.

B.2. Building the Graph (Block 308)

This subsection provides additional detail regarding block 308, which involves creating a graph based on the similarity exhibited by the input images. As stated above, the graph includes nodes that are associated with respective images. A link (also known as an edge) between any given pair of nodes defines an assessed similarity between these two nodes. According to one exemplary implementation, the animation module 110 can use the L2 norm (Euclidian distance) as a distance measure to quantify similarity, although other distance measures can be used.

Next, the animation module 110 can delete edges in the graphs that have large weights. This has the effect of eliminating relationships among dissimilar images. The animation module 110 can then re-compute the distances between nodes affected by edge deletions. The distance between two such affected nodes can be re-computed as a sum of weights along a minimal-length path that links the two nodes. The minimal weight path can be efficiently computed using various techniques, such as Floyd's algorithm, as described, for instance, in Sedgewick, R., *Algorithms in C++, Part 5: Graph Algorithms,* published by Addison-Wesley Professional, 2001.

Once the graph is built and distances computed, the animation module 110 can calculate optical flow between adjacent pairs of images. The animation module 110 can apply various types of algorithms to compute optical flow. In general, the computation of optical flow is described in, for example, Barron et al., "Performance of optical flow techniques," International Journal of Computer Vision, 12:1, 1994, pp. 43-77. In one exemplary and non-limiting case, the animation module 110 can decimate the images to a lower resolution, such as to about 800×600 pixels. The animation module 110 can then compute a low resolution optical flow between adjacent pairs of nodes (images) using, for example, a technique described in Bergen, J., Anandan, P., Hanna, K, and Hingorani, R., "Hierarchical Model-Based Motion Estimation," Proceedings of the Second European Conference on Computer Vision, 1992, appearing in *Computer Science,* Vol. 588, published by Springer-Verlag, London, pages 237-252. The animation module 110 can is store these optical flow fields for fast video preview as a feedback mechanism. That is, when the steps 308, 310, and 312 in FIG. 3 have been completed, the system 100 can quickly interpolate intermediate frames using the stored optical flow fields to generate a preview video. The user can then view the preview video to judge if it has satisfactory quality. If the results are deemed unsatisfactory, the user can make various modifications to the analysis (e.g., in the manner described in Section C).

Interpolation is performed in the above analysis because the number of sampled frames may be too few to produce a smooth-looking video. To address this issue, the animation module 110 can interpolate using the existing frames to produce new intermediary frames. The animation module 110 can use optical flow information (associated with the motion field of objects within the images) to facilitate generating such intermediary frames. The final video, with the introduction of the intermediary frames, is likely to appear less choppy and more naturalistic compared to the original collection of frames.

B.3. Recovering Partial Temporal Orders (Block 310)

As stated above, the order in which the images are captured may not reflect the true dynamics of the physical scene. Further, unlike video, the input images typically cannot be arranged as a one-dimensional temporal sequence. To address these issues, in block 310, the animation module 110 applies a partial temporal order recovery algorithm to automatically discover orderings for subsets of input images. In a manner described more fully below, the animation module 110 uses the resultant partial temporal orders as reference dynamics for the output image sequence. That is, the animation module 110 selects successive frames of the video so that the ordering of the frames complies with the partial temporal order.

To recover the partial orders, the animation module 110 finds, for each node under consideration in the graph, the node that is farthest away from it (where, again, distance is being used as a metaphor for image similarity). This analysis defines two paths connecting the nodes, referred to as "extremal paths." A first path connects the two nodes in a first direction, while a second path connects the two nodes in a second direction, opposite to the first direction. The animation module 110 records extremal paths as they are generated.

More intuitively stated, an extremal path includes end-nodes tat correspond to two extreme scene states. The intermediate nodes (i.e., the nodes between the end-nodes) correspond to the scene states between the two extremes. For example, consider a scene that presents a pendulum swing back and forth, right to left and then back again. The two end-nodes correspond to temporal states in which the pendulum is located at its left-most position and right-most position, respectively. The intermediate nodes correspond to states in which the pendulum is located somewhere between the extreme left-most and right-most positions, in the course of swinging from left to right or from right to left.

An extremal path may be part of another extremal path. This is not desirable because traversal along one extremal path can end up in another extremal path. This, in turn, can disrupt the overall dynamics of the animated scene, possibly resulting in various artifacts in the animated scene. To address this issue, the animation module 110 can remove extremal paths that are either identical to, or subsets of, other extremal paths. The nodes (images) associated with the remaining extremal paths should appear in the correct temporal order (forward or backward in time).

FIG. 4 shows an example of the determination of extremal paths in a graph. In this figure, each of the five nodes in the graph represents a respective image. The numbers associated with the nodes reflect the capture order of the images. The solid dots represent nodes under consideration, where scenarios (a) through (e) represent different respective nodes under consideration. As described above, for each node under consideration, the animation module 110 finds the farthest node in the graph (relative to the node under consideration), to thereby construct an extremal path. The reverse of an extremal path is also an extremal path. In FIG. 4, the dashed lines indicate candidate extremal paths. As explained above, the animation module 110 also deletes extremal paths that are part of other extremal paths. Application of this rule in FIG. 4 results in the deletion of the paths for scenarios (b) and (c), leaving four extremal paths (a), (d), (e), and the reverse of (e). In the illustrative and non-limiting case of FIG. 2, the arc between nodes 2 and 5 indicates that the images associated with these two nodes have been assessed as similar. In other words, this arc represents an edge in the graph which links two similar images. (Note that, in this illustration, the length of the arc does not represent the degree of similarity.)

B.4. Sampling the Graph (Block 312)

In block 312, the animation module 110 extracts an image sequence. To perform this task, the animation module 110 samples a second-order Markov Chain in the graph. More specifically, given previous and current frames $f_{n-1}$ and $f_n$, respectively, the animation module 110 computes a next frame ($f_{n+1}$) by first computing penalties over all paths and nodes, with a penalty defined as:

$$w_{s,k} = \text{Dist}(\text{Img}(s,k-1), f_{n-1}) + \text{Dist}(\text{Img}(s,k), f_n) \quad (1).$$

In this expression, Img(s, k) corresponds to the k-th node (image) on the s-th path. To improve processing speed, the value of Dist( ) can be taken directly from a pre-computed distance look-up table. The distribution of $w_{s,k}$ determines the probability of choosing Img(s, k+1) as a next frame, based on:

$$P(Img(s, k+1) | f_{n-1}, f_n) \sim \exp\left(-w_{s,k} / \left(\sigma \sum_{s,k} w_{s,k}\right)\right). \quad (2)$$

This expression defines a second-order Markov Chain sampling scheme. More intuitively stated, expressions (1) and (2) together imply that if the (k−1)-th and the k-th images of the s-th path are close to $f_{n-1}$ and $f_n$, respectively, then the selection process is likely to choose the (k+1)-th image of the s-th path as the next frame $f_{n+1}$. In the above sampling scheme, the image subsequence specified by an extremal path provides a reference for the scene dynamics (associated with the temporal coherence among sampled frames). Because many extremal paths share the same sub-paths, so that the $w_{s,k}$'s in expression (1) are the same for these paths, the animation module 110 can smoothly choose among different extremal paths.

Other factors govern the characteristics of the animated scene that is presented to the user. For instance, the user can instruct the animation module 110 to play the animated scene back as a loop. Or the user can instruct the animation module 110 to play the animated scene back as a finite segment. In either the case of looped presentation or finite presentation, the user can instruct the animation module 110 to include random to variation in the animated scene or to omit such random variation. Further, the animation module 110 can adjust the previously-computed preview optic flow fields to an original resolution to interpolate the intermediate frames for the final output. (Note that the general concept of interpolating intermediary frames was discussed above in the context of the preview video.)

The user can also input a parameter to control the relative global speed of motion in the animated scene. The user can input this parameter via a slider-type user interface mechanism or through another kind of interface mechanism. The animation module 110 can vary the number of generated intermediate frames in the image sequence based on the selected speed. Section C provides additional details regarding exemplary user interface presentations through which the user can control the dynamics of the resultant scene.

B.5. Image Decomposition into IARs and SIARs (Block 318)

As described above, in block 318, the animation module 110 allows the user to manually decompose a scene into plural independent animated regions (IARs). More specifically, in one exemplary implementation, the animation module 110 allows the user to define three kinds of regions. A first kind of region corresponds to the above-described IAR. This is a region that contains motion that is effectively independent of other motion in the scene. More formally, an IAR can be defined as a union of the areas that a moving object occupies in the respective input images. A second kind of region corresponds to a stationary portion of the scene. That is, the second kind of region effectively contains no motion. In practice, the animation module 110 can sample an instance of this region in any of the images and replicate this region throughout the synthesized video in order to remove any random motion that is of no interest. The user can explicitly define the above-described two kinds of regions by marking these regions in a user interface presentation (in the manner to be described in Section C). A third kind of region corresponds to remaining unmarked regions of the scene. These regions may contain only a small amount of motion that is not subject to temporal ordering (because such analysis is not likely to significantly improve the realism of the generated animated scene).

The animation module 110 then performs the processing described above in blocks 308-312 with respect to each identified IAR. This aspect of the processing allows temporal sorting of different regions to proceed in a relatively independent manner. This provision, in turn, makes better use of a potentially very limited number of available still images, improving the quality of the final output.

The resultant animated scene is reconstructed from the three types of regions described above using any kind of blending techniques, such as by linearly feathering and interpolating the regions at their respective boundaries (on a frame-by-frame basis). This blending operation produces a more seamless-looking video. In processing the above-described regions, the animation module 110 can dilate the regions by a few pixels to ensure smooth transition across the boundaries between different regions after blending these regions. That is, according to one technique, the regions are more satisfactory blended by ensuring that the regions overlap each other by a small amount.

When an IAR with a relatively large area has significant motion variation, the number of instances of this area may be too sparse to duplicate the true dynamics of the IAR. In such a case, the user can request that the IAR be automatically decomposed into semi-independent animated regions (SIARs) for further analysis and animation, where weak constraints between adjacent SIARs are enforced to ensure that their overall flow fields are similar.

The animation module 110 partitions an IAR into plural SIARs using image-based frequency as a criterion. More specifically, the basic premise which underlies this 11 partitioning is that the boundaries between SIARs should ideally lie within low frequency areas of the scene. This is desirable to reduce significant blur in the final animated scene. The animation module 110 performs the partitioning operation in automatic fashion because the user may find it difficult (or impossible) to manually perform this task with suitable accuracy.

In the partitioning process, the animation module 110 first identifies common low-frequency areas ($A_{LF}$) in all time instances of an IAR under consideration. This produces initial low-frequency output. The animation module 110 then skeletonizes the initial low-frequency output using any kind of suitable algorithm, such as the skeletonization algorithm described in Fisher, B., Perkins, S., Walker, A, and Wolfart, E., "Thinning," Hypermedia Image Processing Reference, 1994, Department of Artificial Intelligence, University of Edinburgh, UK, available via the Internet. This process produces skeletonized low-frequency output. At the name suggestions, a skeletonization algorithm reduces the complexity of information to a basic frame structure. However, the process of skeletonization may itself identify too many small regions that typically do not preserve a desired global visual effect when simultaneously animated. Consequently, the animation module 110 can further reduce the complexity of the skeletonized low-frequency output. One way of performing this task is by selecting optimal or quasi-optimal boundaries in the skeletonized low-frequency output. To do so, the animation module 110 first builds a graph such that each junction in the skeletonized low-frequency output defines a node. The weight between directly connected junctions is the sum of the gradient magnitudes along a curve connecting the junctions and over all time instances. The animation module 110 can then compute a minimum spanning tree of the graph (as described, for instance, by the above-described Sedgewick reference), and can then sequentially find paths (boundaries) on the tree to separate the IAR into SIARs until a predetermined number of SIARs is found. Starting with the IAR, at each pass, the animation module 110 finds the longest path that is completely inside one of the existing regions (the endpoints being the exceptions).

FIG. 5 shows the decomposition of a scene into plural regions, and then the decomposition of an IAR within the scene into a predetermined number of SIARs. Starting with FIG. 5(*a*), this figure shows the decomposition of an image of a lake into an IAR 502 associated with a water portion of the scene. Portion 502 exhibits ripple motion that represents the movement of waves in the actual physical scene. The scene also includes a stationary region 504 and two regions 506 having only slowly moving content (where neither of these two kinds of regions plays a significant role in animating the scene). The animation module 110 applies low-frequency analysis to the IAR 502 to produce the above-described initial low-frequency output, which is shown in FIG. 5(*b*). The animation module 110 then skeletonizes the initial low-frequency output to produce the above-described skeletonized low-frequency output, which is shown in FIG. 5(*c*). The animation module 110 then reduces the complexity of the skeletonized low-frequency output to generate a predetermined number of SIARs, which is shown in FIG. 5(*d*). In this particular exemplary case, the animation module 110 produces 5 SIARs, which are individually labeled in FIG. 5(*d*). The length of a mutual boundary between SIARs i and j is $l_{ij}$. The dynamics incompatibility among the SIARs is measured based on $l_{ij}$.

It is preferable to generate the SIARs in such a manner that the final animated scene does not include perceptible transitions between neighboring SIARs. One way of achieving this result is to generate the SIARs so that the SIARs are weakly or softly interdependent. This, in turn, can be implemented in theory by globally and exhaustively analyzing the effects of each SIAR on all of the other SIARs. However, this task may be computationally prohibitive for some applications. As an approximation, the animation module 110 can process the SIARs sequentially. In this approach, the degree of dynamics incompatibility among the SIARs is dependent on the processing order of the SIARs. Therefore, it is desirable to find a preferred processing order of SIARs to reduce the incompatibility among the SIARs.

One way of determining a preferred ordering is described as follows. Except for the first-processed SIAR, the motion in each of the SIARs $S_k$ is dependent on the motion in its reference SIAR $S_r$ that was previously processed and has a longest common boundary with $S_k$. Let $S_{i1}, S_{i2}, \ldots, S_{im}$ represent the remaining previously processed spatially neighboring SIARs. The dynamics incompatibility between $S_k$ and $S_{i1}, S_{i2}, \ldots, S_{im}$ can be measured by the sum of the length of the common boundary between $S_k$ and $S_{i1}, S_{i2}, \ldots, S_{im}$. Minimizing the total dynamics incompatibility, however, is a combinatorial problem. As the number of SIARs is usually small (which, in this illustrative example, is limited to five), a brute force search is adequate to find a preferred order. While this preferred order may not be unique, it produces satisfactory results for many practical cases.

Having performed the above analysis, the animation module 110 can generate the video for the first processed SIAR in the same manner described above (e.g., with reference to blocks 308-312). To produce best results, the other SIARs are not independently generated. Rather, each of these other SIARs can use the dynamics of its respective reference SIAR as a constraint. More specifically, to account for weak dependence on reference SIARs that have already been processed, the following term can be added to $w_{s,k}$ in expression (1):

$$\lambda \| \bar{v}(\text{Img}(s,k), \text{Img}(s,k+1)) - \bar{v}(f_n, f_{n+1}) \| \quad (3)$$

The animation module 110 can then sample the graph as before using expression (2). Here, λ represents a value that that can be set to a predetermined constant (e.g., 0.05 times the average weight of the graph that connects similar time instances of the SIAR). $\bar{v}(x,y)$ represents an average flow direction between x and y. Note that $f_n$ refers to the n-th frame of the image sequence previously generated for the reference SIAR (not the current SIAR). The extra term specified in expression (3) forces the average flow direction from the current frame to the next frame to be close to that in the reference SIAR.

B.6. Temporal Reordering (Block 320)

In block 320, the animation module 110 can ask the user to verify whether the images that it has automatically determined to be similar are actually perceptually close together. If the user concludes that the images not are perceptually close, the animation module 110 can allow the user to delete appropriate edges from the graph produced in block 308. The user can also manually sort images or parts thereof. After these types of modifications, distance information and path information associated with the graph are updated accordingly.

B.7. Editing Motion Dynamics (Block 322)

In block 322, the animation module 110 allows the user to manually adjust the dynamics of the animated scene. For instance, the user may consider the motion produced by the animation module 110 as unnatural for one or more parts of the animated scene. To address this issue, the user can input one or more parameters which modify the behavior of the animated scene. More specifically, the user can specify motion parameters for each IAR. (Note that the motion properties of SIARs are inherited from their parent IAR.)

Different implementations of the animation module 110 may allow the user to specify different respective sets of parameters. In other words, the kinds of parameters that are user-definable is an application-specific consideration. In one case, the animation module 110 allows the user to input a value for σ, used in expression 2. This parameter governs the smoothness of motion in the animated scene. The animation module 110 can also allow the user to input a number between 0 and 1 that defines a measure of motion irregularity, which, in turn, defines the probability of accepting $f_{n+1}$ if $f_{n-1}$, $f_n$, and $f_{n+1}$ are on the same extremal path and the direction from $f_n$ to $f_{n+1}$ is the reverse of that from $f_{n-1}$ to $f_n$ (where the frames $f_{n-1}$, $f_n$, and $f_{n+1}$ represent images as defined above). The animation module 110 can also allow the user to specify a parameter that governs whether the speed of motion decelerates or accelerates when the direction of motion reverses. The animation module 110 can allow the user to define yet additional motion-related parameters.

As a general observation, the parameters specified in block 322 do not, by themselves, fully capture the motion of the scene. Rather, it is the parameters in conjunction with the automated analysis performed in blocks 308-312 that satisfactorily model the dynamics of the scene. In other words, the analysis automatically extracts certain characteristics of the motion of the scene, reducing the need for the user to perform extensive and potentially burdensome interaction with the animation module 110 to model the scene.

C. Exemplary User Interface Presentations (FIGS. 6-8)

Figure 6:
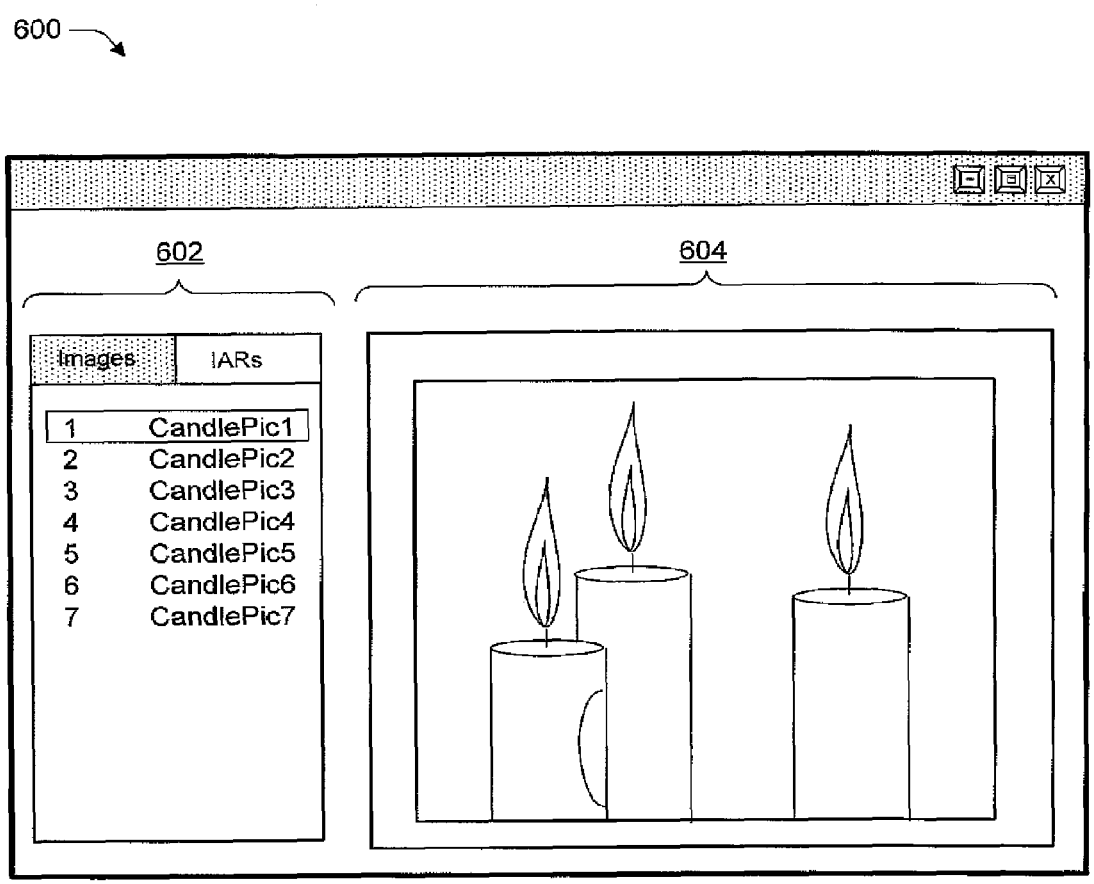
FIGS. 6-8 show various exemplary user interface presentations that can be produced by the system of FIG. 1.
Figure 7:
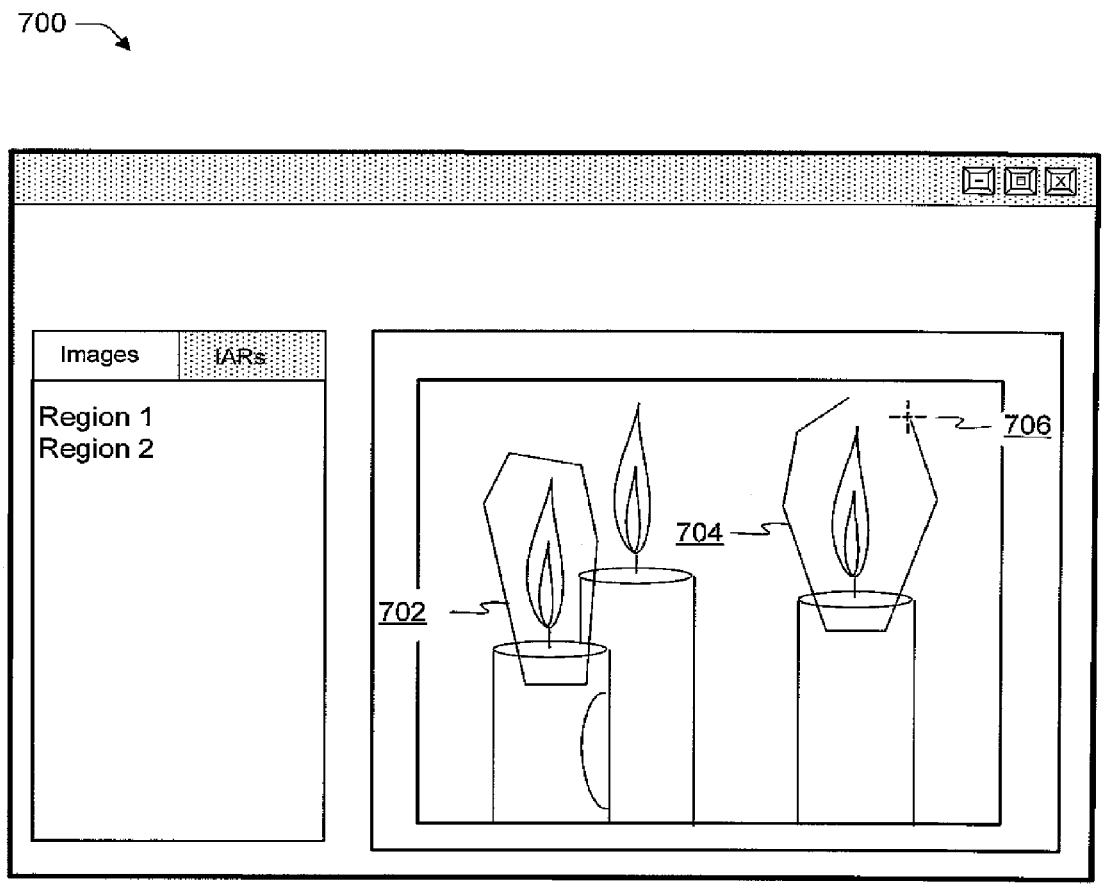
Figure 8:
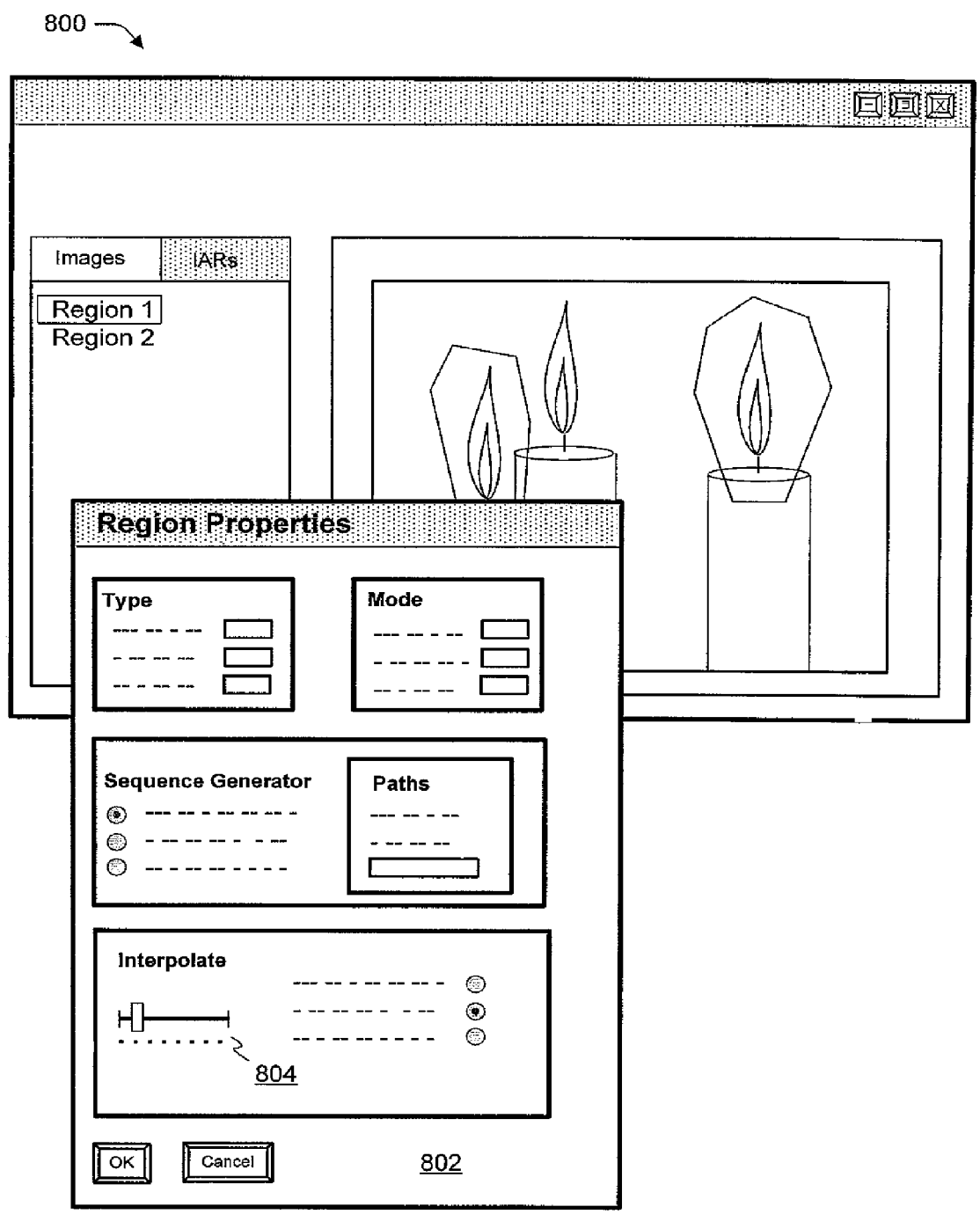

FIGS. 6-8 show three exemplary user interface (UI) presentations that can be produced by the animation module 110 of FIG. 1. The computer 102 can display these user interface presentations on the display device 120. The user can interact with these user interface presentations using any kind of input mechanism 118.

C.1. UI for Selecting Images

FIG. 6 shows a user interface presentation 600 that allows a user to select a collection of images to be synthesized to produce an animated scene. The user interface presentation 600 can include a first window portion 602 that shows the file names of a collection of images. The user interface presentation 600 can further include any kind of conventional selection mechanism (not shown) which allows the user to select and import these images. The user interface presentation 600 includes a second window portion 604 that shows a depiction of one of the images in the first portion 602, in this case, the first image.

C.2. UI for Selecting IARs

FIG. 7 shows another user interface presentation 700 that allows a user to define independent animated regions (IARs) within a selected input image. In the illustrated exemplary case, the image includes two IARs. The animation module 110 can permit the user to demarcate these IARs by tracing the perimeters (702, 704) of these IARs using a mouse device or other kind of input device. For instance, FIG. 7 shows, by the position of a cursor 706, that the user is in the process of drawing the perimeter of an IAR for the right-most candle. Although not shown, the user interface presentation 700 (or another kind of user interface presentation) can allow the user to input an instruction to decompose any selected IAR(s) into plural SIARs. For example, the user interface presentation 700 can allow the user to enter this instruction via a drop-down menu (not shown).

C.3. UI for Specifying Motion-Based Parameters

Finally, FIG. 8 shows another user interface presentation 800 that allows the user to define parameters which govern the dynamics of motion in the animated scene. Namely, in one implementation, the user can select an IAR and define motion parameters which locally govern the motion of this IAR. Thus, different IARs can be governed by different sets of parameters. In the example of FIG. 8, for instance, the motion of the left-most flame can be defined to be perceptually different from the motion of the right-most flame.

FIG. 8 specifically shows that the user interface presentation 800 includes a window portion 802 that allows the user to input various parameters for the left-most flame. As discussed above, the specific parameters that are received are application-specific. To cite one particular example, the user can define the speed of motion in the scene using a graphical slider bar mechanism 804 or like mechanism.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method for producing an animated scene on a display device from plural still images, the method comprising:
    receiving, by a computer including a processing unit executing an animation module, plural still images that are produced with an image capturing device at respective capture times;
    decomposing, by the computer, a scene represented by the plural still images into one or more independent animated regions (IARs), wherein each of the one or more IARs comprise a portion of the scene and not the entire scene;
    identifying, by the computer, an IAR having a level of motion above a defined threshold;
    decomposing, by the computer, the identified IAR into plural semi-independent animated regions (SIARs), wherein the SIARs are defined to be interdependent;
    with respect to each IAR, producing, by the computer, an animated scene by synthesizing the plural still images, wherein the synthesizing involves reordering the plural still images, thereby producing separate animated scene results for each respective IAR; and
    storing, by the computer, the separate animated scene results in memory of the computer.

2. The method of claim 1, wherein the image capturing device is a digital camera.

3. The method of claim 1, wherein the producing of the animated scene with respect to each IAR comprises:
    creating, by the computer, a graph based on an analysis of similarity among the plural still images;
    performing, by the computer, partial temporal order recovery to define a partial ordering among the plural still images; and
    extracting, by the computer, an output sequence from the plural still images, using the partial ordering as a reference.

4. The method of claim 3, wherein the creating of the graph comprises using a Euclidian (L2) distance measure to assess similarity among images.

5. The method of claim 3, wherein the creating of the graph comprises removing paths in the graph having a similarity measure beyond a defined threshold.

6. The method of claim 3, wherein the performing of the partial temporal order recovery comprises finding extremal paths in the graph, wherein an extremal path links a node under consideration to a node which is farthest from the node under consideration.

7. The method of claim 6, wherein the finding of the extremal paths further comprises deleting any extremal paths that are subsets of one or more other extremal paths.

8. The method of claim 3, wherein the extracting of the output sequence comprises sampling the graph using second-order Markov Chain analysis.

9. The method of claim 1, wherein the producing of the animated scene comprises combining and blending the separate animated scene results to produce the animated scene.

10. The method of claim 1, further comprising defining, by the computer, at least one motion parameter for at least one IAR that governs behavior of the IAR in the animated scene.

11. One or more computer readable storage devices containing machine-executable instructions, the instructions when executed by the computer, configuring the computer to perform the method of claim 1.

12. An apparatus comprising:
    a processing unit;
    memory including an animation module, the animation module executable by the processing unit to:
        receive plural still images that are produced by an image capturing device at respective capture times;
        produce an animated scene by synthesizing the plural still images, wherein the synthesizing involves reordering the plural still images, wherein the producing the animated scene comprises:
            creating a graph based on an analysis of similarity among the plural still images;
            performing partial temporal order recovery to define a partial ordering among the plural still images by finding extremal paths in the graph, wherein an extremal path links a node under consideration to a node which is farthest from the node under consideration;

extracting an output sequence from the plural still images using the partial ordering as a reference; and store the output sequence in the memory.

13. The apparatus of claim 12, wherein the producing of the animated scene comprises combining and blending the separate animated scene results to produce the animated scene.

14. A computer-implemented method for producing an animated scene from plural still images, comprising:

providing plural still images that are produced at respective capture times using a digital camera;

decomposing a scene represented by the plural still images into a plurality of independent animated regions (IARs);

creating a graph based on an analysis of similarity among the plural still images;

performing partial temporal order recovery after creating the graph, wherein the partial temporal order recovery defines a partial ordering among the plural still images;

extracting an output sequence from the plural still images, using the partial ordering as a reference, wherein:

the creating, performing, and extracting are separately performed by a processing device with respect to the plurality of IARs, an IAR that has a level of motion above a defined threshold is further decomposed into plural interdependent semi-independent animated regions (SIARs), wherein the creating, performing, and extracting are independently performed with respect to at least a first SIAR, while the creating, performing, and extracting of other SIARs are performed based on the dynamics of a respective reference SIAR as a constraint; and storing the output sequence in a device memory.

15. One or more computer readable storage devices containing machine-executable instructions, the instructions when executed by the processing device, configuring the machine to implement the method of claim 14.

16. An apparatus comprising the processing device to produce an animated scene from plural still images comprising logic configured to implement the method of claim 14.

17. The method of claim 14, further comprising defining at least one motion parameter for at least one IAR that governs behavior of the IAR in the animated scene.

* * * * *